(12) United States Patent
Shmunis et al.

(10) Patent No.: US 8,384,942 B1
(45) Date of Patent: *Feb. 26, 2013

(54) MESSAGE PREVIEW CONTROL

(75) Inventors: Vladimir G. Shmunis, Hillsborough, CA (US); Vlad Vendrow, Redwood City, CA (US); Bruce Young, San Jose, CA (US)

(73) Assignee: Ringcentral, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,963

(22) Filed: Feb. 23, 2012

Related U.S. Application Data

(63) Continuation of application No. 11/998,150, filed on Nov. 27, 2007, now Pat. No. 8,134,727.

(60) Provisional application No. 60/861,769, filed on Nov. 27, 2006.

(51) Int. Cl.
*G06F 15/00* (2006.01)
*G06F 3/12* (2006.01)
*G06K 1/00* (2006.01)

(52) U.S. Cl. ...................................... 358/1.15; 358/1.13
(58) Field of Classification Search .................. None
See application file for complete search history.

(56) References Cited

U.S. PATENT DOCUMENTS

| 6,961,410 | B1 | 11/2005 | Castanaga |
| 8,134,727 | B1 | 3/2012 | Shmunis et al. |
| 2007/0198677 | A1 | 8/2007 | Ozhan et al. |
| 2011/0191441 | A1 | 8/2011 | Herriman et al. |

*Primary Examiner* — Douglas Tran
(74) *Attorney, Agent, or Firm* — Stolowitz Ford Cowger LLP

(57) ABSTRACT

Embodiments of the invention relate generally to computing devices and systems, as well as software, computer programs, applications, and user interfaces, and more particularly, to systems, devices and methods to facilitate message preview control. For example, the method may include generating representations for messages to present on an interface, and detecting selection of the representation for the message. Further, the method can include presenting preview information for the message, which can be an electronic facsimile. The representations for the messages can include a representation for an electronic facsimile, as well as a voice message and an email.

20 Claims, 8 Drawing Sheets

US 8,384,942 B1

MESSAGE PREVIEW CONTROL

CROSS-REFERENCE TO RELATED APPLICATIONS

This application is a continuation patent application of U.S. Nonprovisional patent application Ser. No. 11/998,150 filed Nov. 27, 2007, which claims the benefit of U.S. Provisional Patent Application No. 60/861,769, filed Nov. 27, 2006 and entitled "Message Preview Control," all of which are herein incorporated by reference for all purposes.

FIELD OF THE INVENTION

Embodiments of the invention relate generally to user interfaces, and more particularly, to systems, devices and methods to facilitate, for example, real-time control of previewing messages, such as electronic mail ("email") messages, electronic facsimiles, and voice messages, among others.

BACKGROUND

While conventional messaging systems provide various mechanisms to electronically deliver a message from a sender to a recipient, these mechanisms typically require processing of a message (e.g., the entire message) to access the content of the message. As such, a user typically opens a message to retrieve the content of the message before the user can ascertain, at least in some circumstances, whether the message is of value to the user. While this may be functional when a user peruses through small groups of messages, this approach hinders the ability of a user to determine the content for relatively large amounts of messages. Further, a user usually consumes time and effort opening and/or viewing the messages, including messages sent by commercial agencies or advertising campaigns, instead of being able to immediately identify whether a message is relevant to the user.

Thus, a solution is needed to provide an apparatus, a method and a system for previewing messages, without the limitations of conventional techniques.

BRIEF DESCRIPTION OF THE DRAWINGS

The invention and its various embodiments are more fully appreciated in connection with the following detailed description taken in conjunction with the accompanying drawings, in which.

DETAILED DESCRIPTION

Figure 1A:
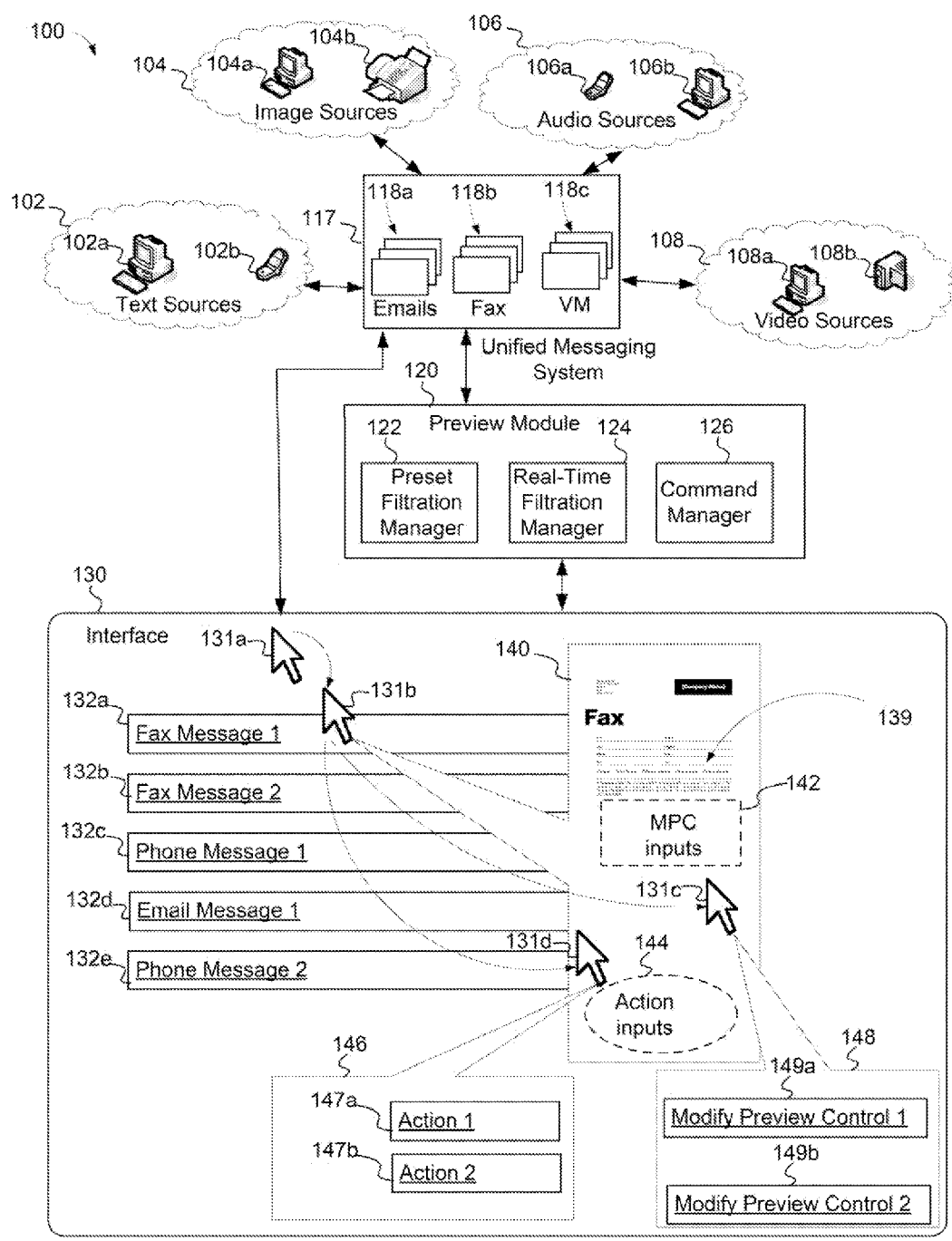
FIG. 1A illustrates a block diagram of an example of a preview module being used to facilitate the previewing of a variety of messages, according to various embodiments of the invention.

FIG. 1A illustrates a block diagram of an example of a preview module being used to facilitate the previewing of a variety of messages, according to various embodiments of the invention. Here, diagram 100 shows a unified messaging system 117, a preview module 120, and an interface 130. Unified messaging system 117, among other things, can be configured to receive messages from a variety of transmitting devices, such as mobile phones, computing devices, fax machines, image capture devices (e.g., cameras, scanners, etc.), and the like. Examples of such messages include electronic mail messages ("emails") 118a, electronic facsimiles ("fax") 118c, voice messages ("VM") 118c, and the like. Further, the messages can include one or more types of content. For example, a message can include one or more of the following: (1) text from text sources 102, such as from a computing device 102a with an email application, a mobile device 102b with text messaging capabilities, or the like, (2) an image from image sources 104, such as from a computing device 104a configured to send images, (e.g., in JPEG, TIFF, PDF and other comparable formats), a fax machine 104b (e.g., PSTN or VoIP-compliant), or the like, (3) audio from audio sources 106, such as from a phone 106a (e.g., a voice message from a mobile phone) or a computing device 106b (e.g., a computing device configured to transmit an audio file), and (4) video from video sources 108, such as from a computing device 108a or a video camera 108b. Unified messaging system 117 can be configured to provide access to messages 118a to 118c by providing representations 132a to 132e at interface 130. A user can interact with representations 132a to 132e to access portions of, or content relating to, messages 118a to 118c by using a user input device, such as a mouse pointer 131a, as an example. Preview module 120 is configured to present preview information for messages 118a to 118c in, for example, a preview window 140. In one or more embodiments, preview window 140 can be generated in response to a user interaction, such as when mouse pointer 131b hovers over, or is positioned at or near a defined area (e.g., over representation 132a), which can be configured to invoke presentation of preview information in preview window 140.

In view of the foregoing, preview module 120 can be configured to provide access to the content and/or contextual message information of messages 118a to 118c, or any other type of messages, without requiring the processing (e.g., the simultaneous processing) of both the content and contextual message information for a specific message, according to one or more embodiments of the invention. Specifically, preview module 120 can be configured to present preview information that includes a portion of a message, information relating to the message, or some modified version of the message that is suitable for previewing in the context of preview window 140. As such, the preview information can provide a user with information to determine whether to defer or avoid opening a message, thereby preserving computational resources, as well as time, that otherwise would be expended on accessing and opening the message. The presented preview information can be perceived visually and/or audibly, according to various examples. Further, preview module 120 can be configured to provide selectable control inputs to enable a user to, for example, modify the presentation of the preview information or perform an action based on the preview information. By modifying the presentation of the preview information, a user can enhance the presentation of the preview information so that the user, for example, can access additional information with which to determine whether to skip opening the message. By performing an action based on the preview information, a user can use the preview information to take action, such as making a phone call or sending an electronic facsimile, without requiring the processing (e.g., the simultaneous processing) of both the content and contextual message information for the message. In various embodiments, preview module 120 can provide control inputs coextensive to the presentation of either the preview information or representations 132, or both, so as to avoid obscuring the preview information or at least some of representations 132, which, in turn, can obviate transitioning back and forth between one or more windows to determine the content (or other information, such contextual message information) of messages. As used herein, the term "preview information" can generally refer, at least in one embodiment, to a portion of a message including, but not limited to, components relating to content or contextual message information, or both.

As shown, preview module 120 can include a preset filtration manager 122, a real-time filtration manager 124, and a command manager 126. Preset filtration manager 122 can be configured to manage the filtration of content prior to presenting (e.g., displaying) the preview information. For example, preset filtration manager 122 can initiate the filtering components of a message to form filtered components prior to the detection of the selection of a representation for the message. In some examples, preset filtration manager 122 can use the filtered components responsive to request for preview information. In one or more examples, preset filtration manager 122 can filter components of a message to exclude or include components based on rules (e.g., predetermined rules), to optimize the presentation of the preview information. To illustrate, consider that a user moves a mouse pointer from a first position (depicted as mouse pointer 131a) to a second position (depicted as mouse pointer 131b) to preview a fax message associated with representation 132a. The placement of mouse pointer 131b in relation to representation ("fax message 1") 132a can cause the presentation of a replica of the message as preview information 139. Here, the replica of the message has reduced resolution relative to the message. In one or more embodiments, preview information 139 can include fax components (not shown), which can include, but are not limited to, data representing the content for an electronic facsimile, as well as contextual message information, such as a recipient fax phone number, a fax subject line, a time and date stamp; a cover sheet, and the like.

Real-time filtration manager 124 can be configured to manage the filtration of the content (and/or contextual message information) to modify the presentation of the preview information. For example, real-time filtration manager 124 can be configured to filter the components of a message to form real-time filtered components subsequent to the detection of the selection of a representation for the message. As such, real-time filtration manager 124 can filter the components of a message to exclude or include the filtered components (i.e., the components that were preset, or predetermined) to modify the presentation of the preview information (e.g., by zooming in on or out cola replica image, or by speeding up or slowing down the playing of audio). The modification of the preview information can be based on rules and/or user input. To illustrate, consider that real-time filtration manager 124 can present one or more control inputs in preview window 140, such as modify preview control ("MPC") inputs 142. Continuing with the example of previewing an electronic facsimile, modify preview control inputs 142 can include selections (e.g., a zoom in button or a zoom out button) to either zoom in on or zoom out from preview information 139, as well as selections to navigate up, down, left or right, with respect to preview window 140. Real-time filtration manager 124 can accept the selection of modify preview control inputs 142, and, in response, present the modified preview information (e.g., a zoomed image or enlarged text) in either preview window 140 or another preview window (not shown). Alternatively, real-time filtration manager 124 can present one or more control inputs in a preview modification window 148, which can present modify preview control inputs 142 as modify preview control ("1") 149a and modify preview control ("2") 149b. Preview modification window 148 can be generated responsive to the placement of the mouse pointer (depicted as mouse pointer 131c) at, near, or over preview window 140.

Command manager 126 can be configured to initiate and/or manage the performance of an action using a portion of the preview information. For example, command manager 126 can be configured to perform an action using content (or the contextual message information) of a message without requiring the processing (e.g., the simultaneous processing) of both the content and contextual message information for a specific message. To illustrate, consider that command manager 126 can present one or more control inputs in preview window 140, such as action inputs 144. Action inputs 144 can be accessed via, for example, a drop down menu of selections, or, by "right clicking" a mouse. Continuing with the example of previewing an electronic facsimile, action inputs 144 can include selections to respond to a fax message (e.g., using a recipient fax number presented as part of the preview information), call the sender of the message, open an electronic document as an attachment to a fax message, and the like. Command manager 126 can accept the selection of action inputs 144, and, in response, invoke an application (e.g., a computer program) to perform the command. Alternatively, command manager 126 can present one or more control inputs in a preview action window 146, which can present action inputs 144 as action input ("1") 147a and action input ("2") 147b. Preview action window 146 can be generated responsive to the placement of the mouse pointer (depicted as mouse pointer 131d) at, near or over preview window 140.

Note that while the above-described examples relate to the modification of preview information and actions performed for an electronic facsimile message, preview module 120 can operate similarly in connection with email messages 118a, voice messages 118c, and any other types of messages, such as text and instant messages. As used herein, the term "electronic facsimile" refers generally, to an electronic message that may be formed to include an electronic document, in compliance with specific protocols, such as those associated with ITU T.30 and T.38, or the like. As used herein, the term "electronic document" refers generally, to any data file (e.g., other than computer programs or system files) that are intended to be used in their electronic form, without necessarily being printed, whereby computer networks and electronic display technologies may help facilitate their use and distribution. For example, an electronic document may be included in or form an electronic message, such as an electronic facsimile. The electronic document may be transmitted over the network using special protocols such as T.38 (i.e., a known protocol for real-time fax transmissions across an IP-based network) using User Datagram Protocol ("UDP") or Transmission Control Protocol ("TCP") to process packets across the network. As used herein, the term "electronic message" refers generally, to a message created, generated, sent, communicated, received, and/or stored using any apparatus, system or method having electrical, digital, magnetic, wireless, optical, electromagnetic, or similar capabilities. Examples of electronic messages include emails, text messages, electronic facsimiles, voice messages, and the like.

Figure 1B:
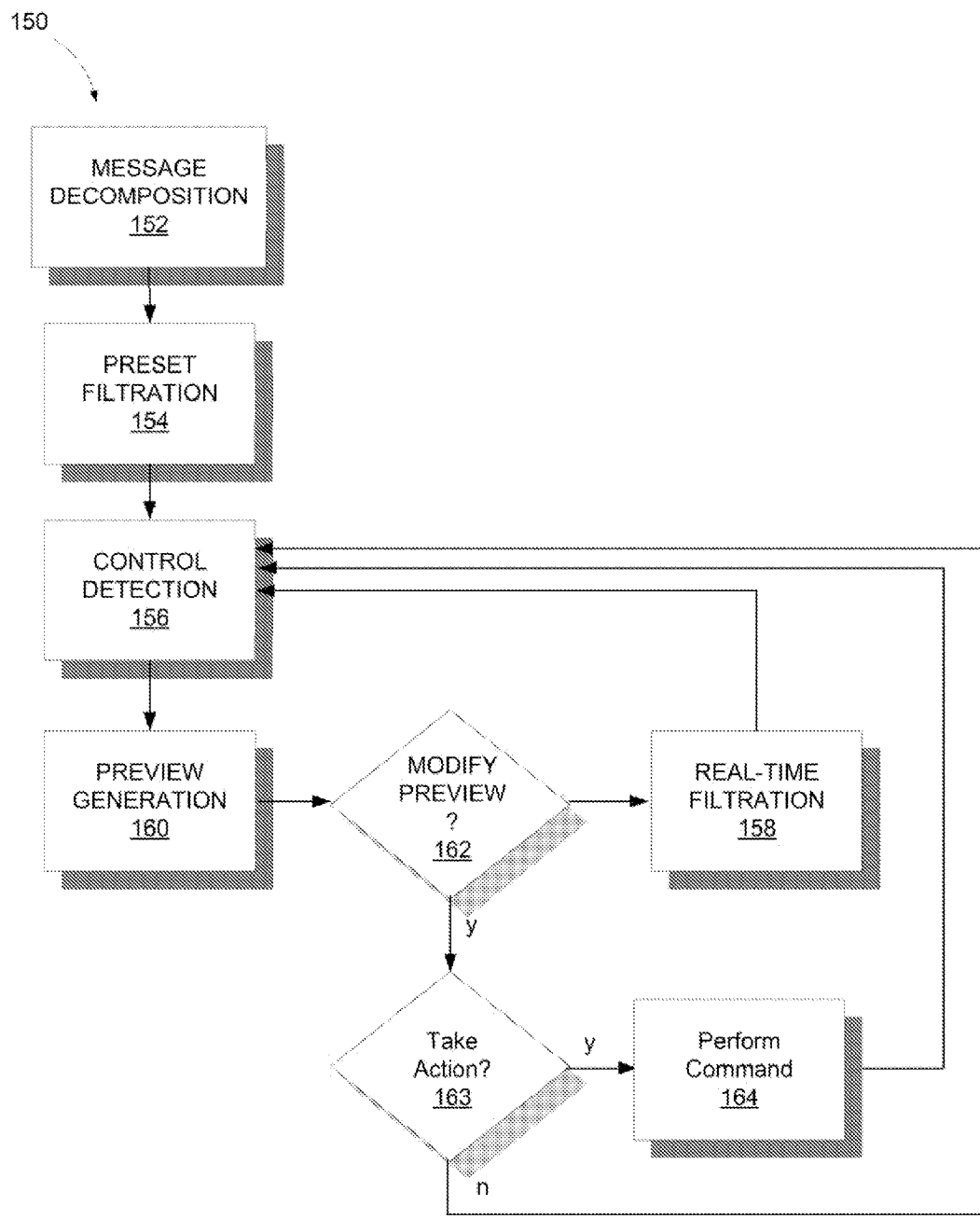
FIG. 1B is a flow diagram depicting an example of a method for controlling the preview of messages, according to at least one embodiment of the invention.

FIG. 1B is a flow diagram depicting an example of a method for controlling the preview of messages, according to at least one embodiment of the invention. Here, flow 150 begins with a message being decomposed at 152 to determine components of the message that can be used to form preview information. At 152, components can also be identified and/or associated with an attribute. At 154, the message can be filtered, for example, according to attributes specified by a set of rules (e.g., settings) that a user (or any other entity) can provide to guide the filtering of the message to include or exclude components in the presentation of preview information. An example of such rules can include, but are not limited to, a rule to decrease the resolution of the message (e.g., an image associated with the message) for a specific attribute, or a rule to capture a portion of an audible message for yet another attribute. In cases in which a text or audio is included as preview information, the rules can be configured to convert text into audio or the audio into text at 154. Flow 150 can determine at 156 whether the selection of a control input, such as the selection of a modify preview control input, is detected. When detected at 156, flow 150 moves to 160 to generate modified preview information based on the control input. In some examples, the control input may cause an action to either enhance or modify the preview to form modified preview information. At 162, a determination is made as to whether to perform real-time filtration. If so, flow 150 moves to 158, at which the flow can provide dynamic filtration in real time, which may include refining the presentation of preview information further. Also, real-time filtered components can be formed at 158. If not, flow 150 moves to 163, at which a determination is made as to whether to take an action. If so, flow 150 performs an action at 164. Otherwise, flow 150 can optionally return to 156 to monitor selection of other control inputs. In other examples, flow 150 and the above-described elements (i.e., the elements shown and/or indicated by reference numerals in FIG. 1B) may be implemented differently in different designs, operations, configurations, and materials, and are not limited to the descriptions provided herein. Note, too, that in various examples, one or more of the process constituting each of the above-described elements can be implemented in, or distributed across, one or more server computing devices, one or more client computing devices, or any combination thereof.

Figure 1C:
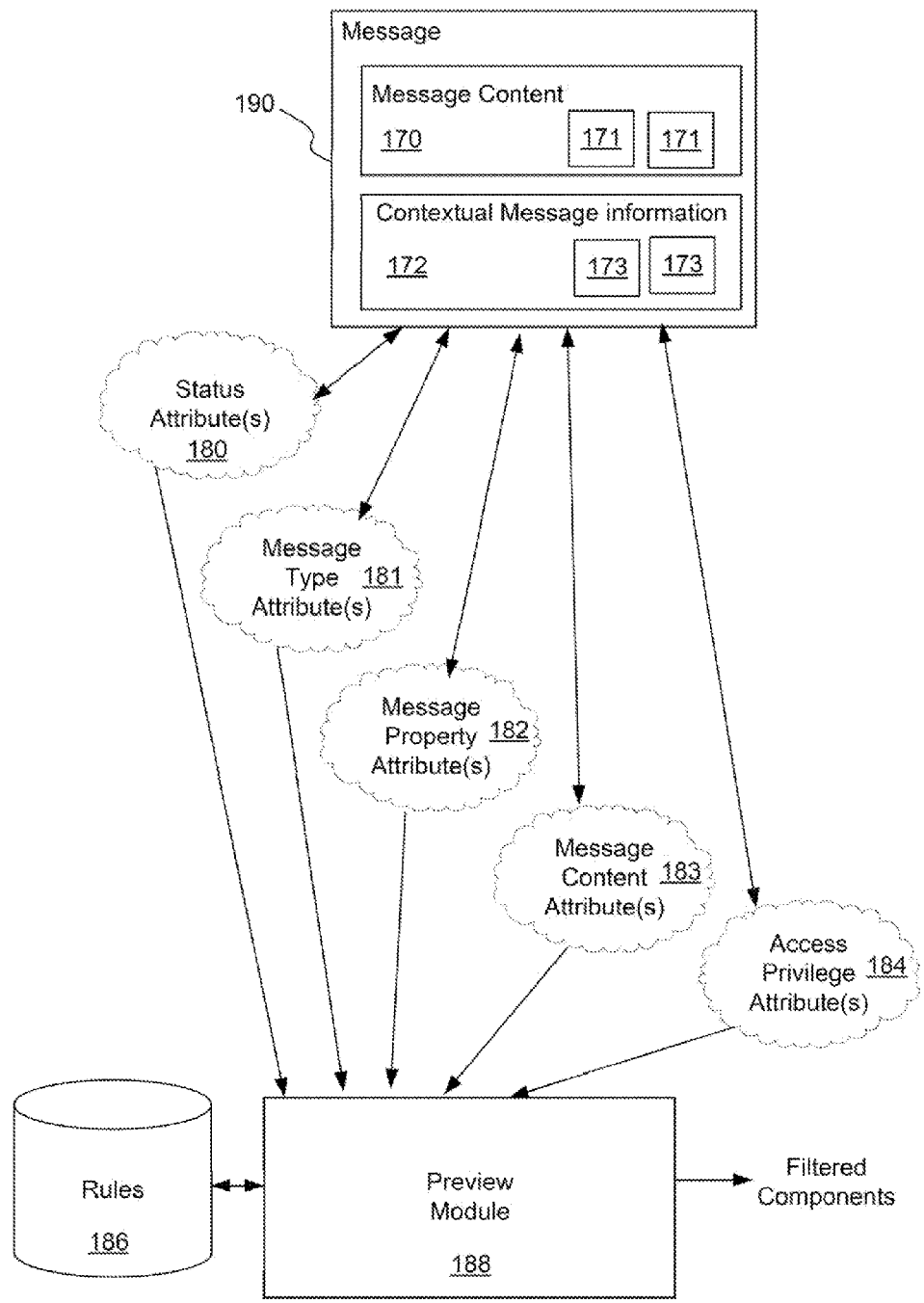
FIG. 1C is a block diagram depicting an example of an implementation of a preview module that provides for message preview control, according to at least one embodiment of the invention.

FIG. 1C is a block diagram depicting an example of an implementation of a preview module that provides for message preview control, according to at least one embodiment of the invention. As shown, a message 190 can include content ("message content") 170 and related information ("contextual message information") 172, which can be decomposed into components 171 and components 173, respectively. Examples of components 171 include images, video, audio, text and other content, as well as portions thereof. Examples of components 173 include contextual information related to message 190. Contextual message information for electronic facsimiles can include fax components, which, in turn, can include, but are not limited to, data representing information about an electronic facsimile, a recipient fax phone number, a fax subject line, a time and date stamp, a cover sheet, the type of image format (e.g., PDF, TIFF, etc.) used, the size of the fax message, and the like. Contextual message information for email messages can include the following as components: envelope and/or header information (e.g., sender email address, recipient email address, message ID, etc.), an indication that the content is text (e.g., the body of the email), attachments, which can be electronic documents or files, the types of content for the attachments, the size of the attachments, the size of the text, and the like. Contextual message information for voice messages can include the following as components: envelope information (e.g., caller's phone number, contact information, a date and time stamp, etc.), an indication that the content is audio (e.g., indicating that the body of the voice message includes audio), length of time of audio, size of audio file, and the like. Note that the term "content," at least in some examples, can refer to contextual message information.

Message 190 can be associated with various attributes, which can be used to describe the message and/or its components. For example, message 190 can be characterized by, or associated with, various attributes. Status attributes 180 can describe a component 173 that indicates whether message 190 is read or unread. Message type attributes 181 can indicate whether message 190 includes one or more of the following components: video, audio, image, and/or text. Message property attributes 182 can include various message properties that can be attributed to message 190 (and/or its components). For example, property attributes 182 can be associated with the following components: a phone number associated with the client device, a name of a user associated with a sending device (e.g., John Smith), a date and time stamp indicative of the time and date of receipt for a message (e.g., Wed Nov. 1, 2006 at 12:23 PM), a length indicator of the message if the message contains audio data (e.g., 0:40 seconds), a number of pages of the message if the message contains text or image data (e.g., 1 page), and the like. Message Content Attributes 183 can include various content that can be attributed to message 190 and to its components. As such, these components can include the actual content and/or the preset filtrated content (e.g., an image for an electronic facsimile, or a portion thereof, that has a reduced resolution). Access privilege attributes 184 can indicate whether a recipient or sender of a message has authorization to, for example, do any of the following: perceive receipt of a message, obtain preview information for the message, access the message, perform actions based on the preview information, modify the presentation of the preview information, and the like.

Preview module 188 can be configured to generate filter components, which can include real-time filtered components. In operation, preview module 188 can access one or rules from repository 186 that define one or more filtration processes. Responsive to the one or more rules, as well as optional user input, preview module 188 can use the attributes to determine which components will form the preview information. For example, preview module 188 can match attributes set forth in the one or more rules to the components of message 190, and, in turn, select relevant components 171 and 173 to form the filtered components.

Figure 2:
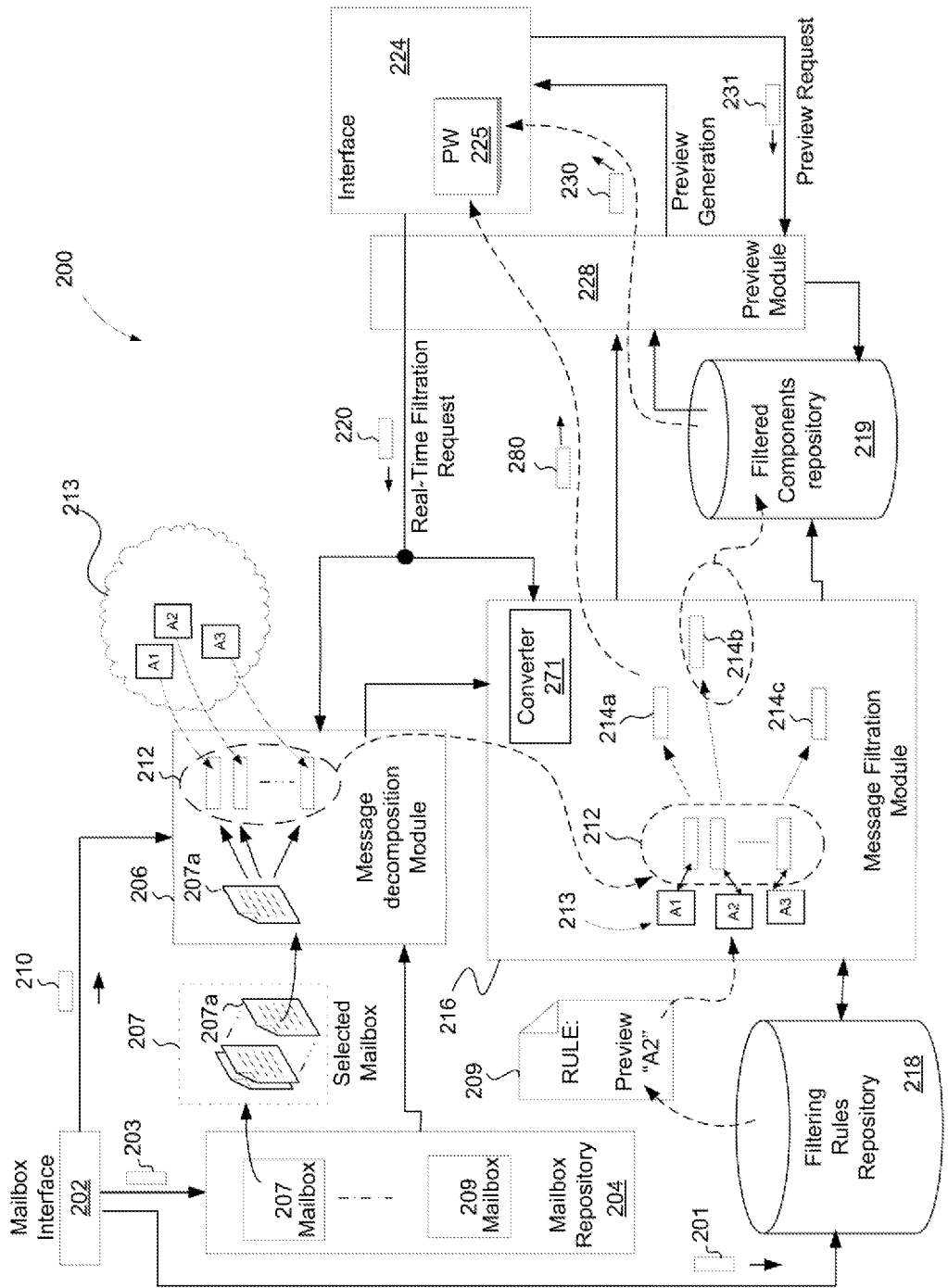
FIG. 2 illustrates a functional block diagram of an example of messaging system, according to various embodiments of the invention.

FIG. 2 illustrates a functional block diagram of an example of messaging system, according to various embodiments of the invention. Here, messaging system 200 includes a mailbox interface 202, a mailbox repository 204 configured to store and manage messages, such as in mailboxes 207 and 209, a message decomposition module 206, and a message filtration module 216. Father, messaging system 200 also is shown to include a filtering rules repository 218, a filtered components repository 219, an interface 224 configured to present preview information, and a preview module 228 for presenting preview, information in one or more preview windows. In some examples, mailbox interface 202 can be equivalent or substantially equivalent to a communication interface, which is an access point for a user (or another entity, such as an administrator) to interact with messages and define filtering rules. In at least one example, mailbox interface 202 can be the same as (or is) interlace 224. In operation, mailbox interface 202 can provide a portal to interact with a repository of mailboxes ("mailbox repository") 204, in which each mailbox includes a cluster of electronic messages. In at least one instance, a cluster is a logical grouping of messages based on, for example, an attribute of a message or a component thereof. Mailbox interface 202 can cause transmission of mailbox control signals 203 to select a mailbox, such as mailbox 207, to access messages associated therewith to manage, for instance, a user's account. In some examples, a user account may be setup to provide account settings, including preferences for managing electronic messages. Mailbox interface 202 can also cause transmission of filtering rule signals 201 to filtering rules repository 218 to store filtering rules (e.g., to add, delete or update rules) for guiding the formation of preview information and modified preview information, as determined by message filtration module 216.

Message decomposition module 206 can be configured to decompose messages, such as message 207a, into constituent components 212. In some examples, message decomposition module 206 can operate to identify components 212 without isolating components 212 from each other. In at least one example, message decomposition module 206 can identify attributes of components 212 and associate one or more identifiers 213 to each component. Here, identifiers 213 can be searchable representations of the attributes associated with components 212. In at least one example, identifiers 213 can identify attributes described in FIG. 1B for message 207a. To illustrate operation of message decomposition module 206, consider that message 207a is an electronic facsimile message. As such, message decomposition module 206 can break down the message to identify components 212 that include fax component data representing the following: content for an electronic facsimile (e.g., an image file, such as in PDF, TIFF, or comparable formats), a recipient fax phone number, a fax subject line, a time and date stamp, a cover sheet, and the like. Further, components 212 can each be associated with an identifier 213. Note that message decomposition module 206 can include a process to break down messages into components 212, according to media formats, and then provide each component 212 with an identifier 213. In other examples, messages 207 can each be decomposed into components 212 that are composed of text and/or images, such as in TIFF, PDF, bitmap, JPEG, and other like image file formats. In still other examples, messages 207 can be decomposed into components 212 composed of audible files, such as MP3, WAV, and like audio file formats. Also, messages can be broken down into components 212 composed of video files, such as in MPEG, MPEG-4, WMV, and like video file formats. In at least one instance, mailbox interface 202 can cause transmission of decomposition control signals 210 to message decomposition module 206 to select message 207a for decomposition from a group of messages 207 constituting mailbox 207.

Message filtration module 216 can be configured to filter components 212 to form filtered components 214a to 214c, which, in turn, can form at least a portion of preview information presented in preview window ("PW") 225 of interface 224. To illustrate, consider that message filtration module 216 can be configured to receive components 212 associated with message 207a along with corresponding identifiers 213. Next, message filtration module 216 can determine the attributes of message 207a (represented here as identifiers 213), and then search filtering rules repository 218 for applicable rules, such as rule 209. Further to this example, rule 209 can require that the component having attribute "A2" form part of the preview information. As an example, attribute A2 can specify a component that includes a reduced image of a fax coversheet. Responsive to rule 209, message filtration module 216 can be configured to generate and store filtered component 214b in filtered components repository 219. Thus, components 212 can be filtered prior to the detection of the selection of message 207a to preview.

Preview module 228 can be configured to manage requests for preview information based on preset filtration and modified preview information based on real-time filtration. To illustrate the former, consider that a user interacting with interface 224 causes a preview request 231 to be generated and transmitted to preview module 228. Preview request 231 is a request to preview message 207a. In response, preview module 228 fetches the preview information that includes filtered component 214b. Preview information 230 can then be presented in association with preview window 225. To illustrate the latter, consider that a user interacts with interface 224 to cause a real-time filtration request 220 to be generated to, for example, present modified preview information at interface 224. Real-time filtration request 220 can be processed by message decomposition module 206, if, for example, real-time decomposition and attribute identification is necessary. Otherwise, message filtration module 216 can respond to real-time filtration request 220 by, for instance, transmitting component 214a as a real-time filtered component for presentation as modified preview information 280 at interface 224.

Note that modified preview information 280 is directly transmitted without intermediary storage, at least in one example, unlike preview information 230. Component 214a can be a resized replica of message 207a at, for example, a higher resolution, if real-time filtration request 220 includes a request to "zoom in." In one or more examples, a converter 271 can be included to perform a conversion on any component 212 to provide for modified preview information. For example, converter 271 can be configured to modify the resolution of audio or images, or to convert one file format into another (e.g., TIFF into PDF, or MP3 into WAV). In a specific embodiment, converter 271 can be configured to convert text in a component into audio, and can be further configured to covert audio in a component into text.

In some examples, message filtration module 216 can filter the data of components to provide introductory segments or customized segments as preview information in preview window 225. For example, consider that message 207a is a text document (e.g., electronic facsimile) with multiple pages and a few embedded graphics (e.g., images). Rule 209 can specify that a quarter-page segment of the message is to form the preview information. As such, message filtration module 216 can generate component 214b to include one-fourth of the first page for presentation in preview window 225. In other examples, message 207a can be a voice message (e.g., voicemail) that is 90 seconds long. Responsive to rule 209 triggering on, for example, an attribute specifying the message as "voice mail," message filtration module 216 can provide an introductory segment of 10 seconds as preview information of the 90 second-long voice message. In some examples, messaging system 200 and the above-described elements (i.e., the elements shown and/or indicated by reference numerals above) can be implemented differently in various designs, operations, configurations, and materials, and are not limited to the descriptions provided herein. As such, any of the elements in FIG. 2 can reside on one or more computing devices, regardless of whether a computing device is a server or a client. Or, the elements in FIG. 2 can be distributed over a network.

Figure 3:
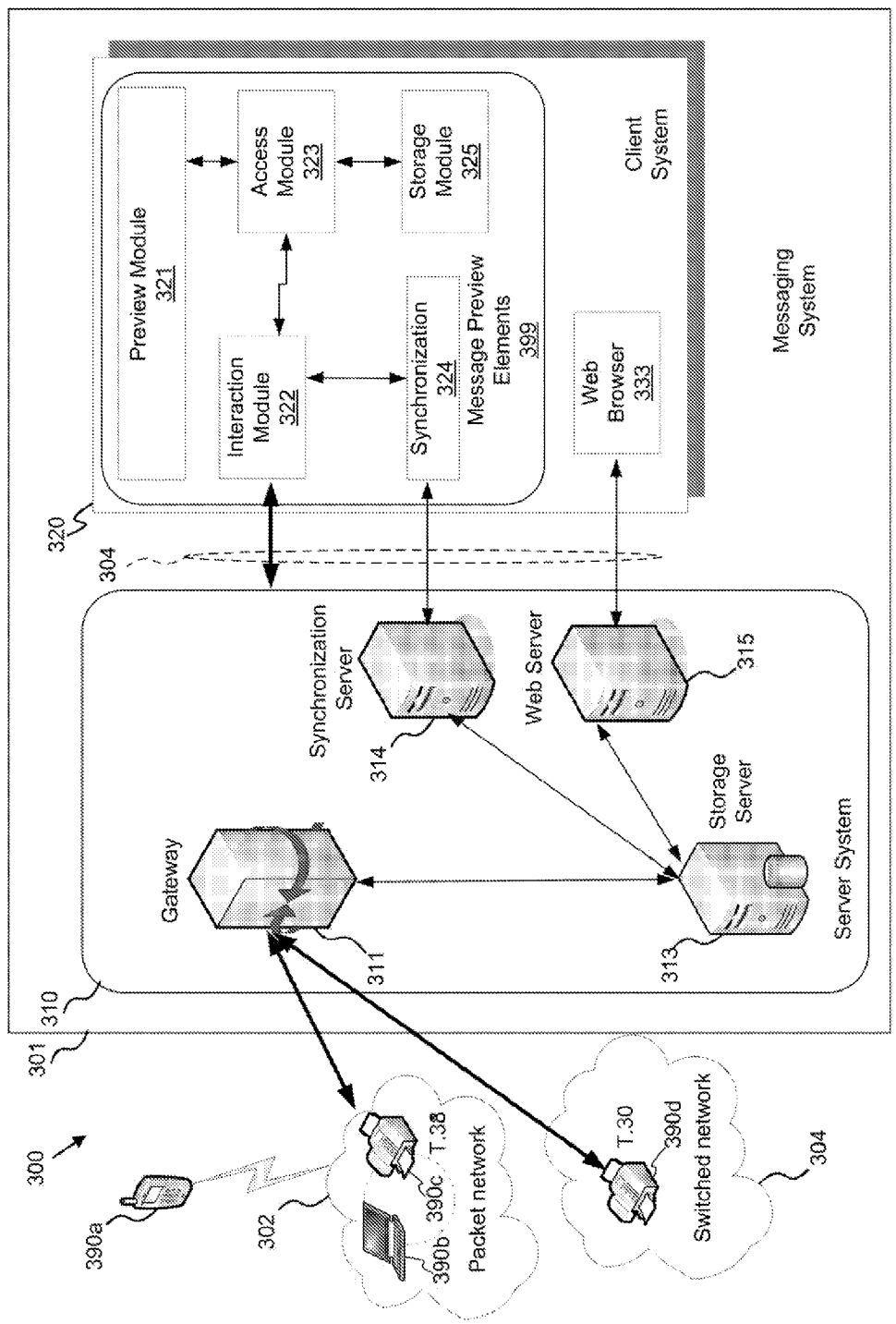
FIG. 3 depicts an example of an implementation for a messaging system in which a client includes a preview module, according to at least one embodiment of the invention.

FIG. 3 depicts an example of an implementation for a messaging system in which a client includes a preview module, according to at least one embodiment of the invention. Here, diagram 300 depicts various transmit nodes 390 as sources of messages into a message system 301. In various embodiments, transmit nodes 390 can be any communication device that transmits electronic messages (e.g., electronic documents, voicemails, and the like) in accordance with various message transfer protocols, including any suitable facsimile ("fax") protocol. For example, transmit node 390d may be configured to send electronic facsimiles as a public-switched-telephone-network ("PSTN")-based device in accordance with, for example, a T.30 protocol. As such, transmit node 390d can be a Group 3 device (e.g., T.30 fax machine) configured to communicate via a public-switched-telephone-network, such as switched network 304. In other examples, transmit node 390c can be configured as a packet-based device to send electronic facsimiles in accordance with a T.38 protocol, or any Fax over Internet Protocol ("FoIP"). In still other examples, mobile phone 390a and computing device 390b can transmit electronic messages using a connection for exchanging packets over a packet network 302 in accordance with a User Datagram Protocol ("UDP"), a Transmission Control Protocol ("TCP"), and the like. In a specific embodiment, electronic messages can be exchanged in accordance with a signaling protocol, such as a Session Initiation Protocol ("SIP"). One example of SIP is as described by the Internet Engineering Task Force ("IETF"), such as in RFCs. Other suitable signaling protocols may include H-.323, Media Gateway Control Protocol ("MGCP") for distributed Voice over IP systems, as defined in RFC 3435, and the like.

Message system 301 can include a server system 310 that includes, for example, a gateway server 311, a storage server 313 for storing messages (e.g., in mailbox and file-based data structures), a synchronization server 314 and a web server 315, and a client system 320. Gateway server 311 can be configured to at least receive messages from various transmit nodes 390, and to store the messages in storage server 313. Gateway server 311 (or another server) can also be configured to perform message decomposition and message filtration. As such, gateway server 311 can include a message decomposition module 206 of FIG. 2 and a message filtration module 216 of FIG. 2. Storage server 313 can be configured to operate as a mailbox repository in some examples, and in other examples, storage server 313 can also be configured to operate a filtering rules repository 218 and a filtered components repository 219, both of FIG. 2. Synchronization server 314 can be configured to synchronize messages between server system 310 and client system 320. Web server 315 is configured to provide a web portal for previewing information for messages via a web-based interface.

In various examples, client system 320 can be implemented to host application software (not shown) as a communication device, such as a personal computer, a smart phone, a fax machine, or any other electronic communication device. Client system 320 is shown to include a preview module 321, an interaction module 322, an access module 323, a storage module 325, a synchronization module ("synchronization") 324, all of which can constitute message preview elements 399. Client system 320 is also shown to include an optional web browser application 333. Preview module 321 can be configured to provide preview information, modified preview information, and/or action inputs to perform an action, thereby enabling a user to quickly and efficiently identify the type and content of a message (and/or contextual message information) without selecting and retrieving the message content or contextual message information. In other examples, preview module 321 can be disposed external to client system 320. Interaction module 322 can be configured to establish an interface 304 through which client system 320 can interact with server system 310. For example, client system 320 can send requests to server system 310, and can receive responses therefrom through interaction module 322. To send a request to server system 310, client system 320 can use interaction module 322 to connect to server system 310 by establishing, for example, an HTTP connection. Subsequently, interaction module 322 can exchange data with server system 310 specific to a request using, for example, an XML parser.

Storage module 325 can be configured to store messages at client system 320. Storage module 325 can be configured to actually store the messages, or can be configured to store information as to where and how the messages are stored within or without client system 320. Access module 323 can be configured as an interface to storage module 325. For example, the content and the properties of a given message in storage module 325 can be accessed and manipulated (e.g., converted) through access module 323. Storage module 325 may be part of access module 323. In at least one embodiment, access module 323 can be configured to function as converter 271 of FIG. 2.

Client system 320 can also include synchronization interface ("synchronization") 324 to synchronize the messages (e.g., electronic facsimiles, voice messages, emails, and the like) in storage server 313 and storage module 325. Also, synchronization interface 324 can synchronize client system 320 with server system 310 to ensure that the states of messages at storage server 313 are the same as the states of messages at storage module 325. Discrepancies between the state of messages at server storage 313 and the state of messages at storage module 325 can arise as a result from various events. Examples of such events include message deletion (e.g., removing a message at server system 310 and not at client system 320, and vice versa), message arrival (e.g., a message arrives at server system 310 and not at client system 320), and the like. In some examples, web browser 333 can be configured to communicate via, for example an HTTP connection, with web server 315 to provide web-based access to preview information. Client system 320 can implement server interface 304 to support interaction to server system 310 using real-time protocol solutions (e.g., SIP, T.38) over the IP network. Server interface 304 can support other protocols, such as SMTP, POP3, Telnet, FTP, and the like.

In various examples, messaging system 301 can be configured to facilitate receiving an electronic facsimile ("fax") between two or more fax nodes, such as any of transmission nodes 390 and client system 320. Examples of such fax nodes include analog group 3 ("T.30") devices, real-time IP-based ("T.38") devices, client-driven email applications, cellular phone message applications, packet-based communication devices such as voice-over-internet-protocol ("VoIP") devices, and other packet-based network elements. As used herein, the term "node" refers generally, to a device as being connected to a computer network (e.g., fax network). For example, a node may be a computer, fax machine, personal digital assistant, cell phone, router, switch, or hub. In some instances, a node is an endpoint, such as any of transmit nodes 390 and client system 320. As used herein, the term "network element" refers generally, to an element within message system 301 that includes either computing hardware or software, or both, for facilitating network communications, and may also refer to a call router (e.g., as a server or as a software module), a gateway, a fax server, a proxy server, and the like. In some examples, messaging system 301 and the above-described elements (i.e., the elements shown and/or indicated by reference numerals above) may be implemented differently in various designs, operations, configurations, and materials, and are not limited to the descriptions provided herein.

Figure 4:
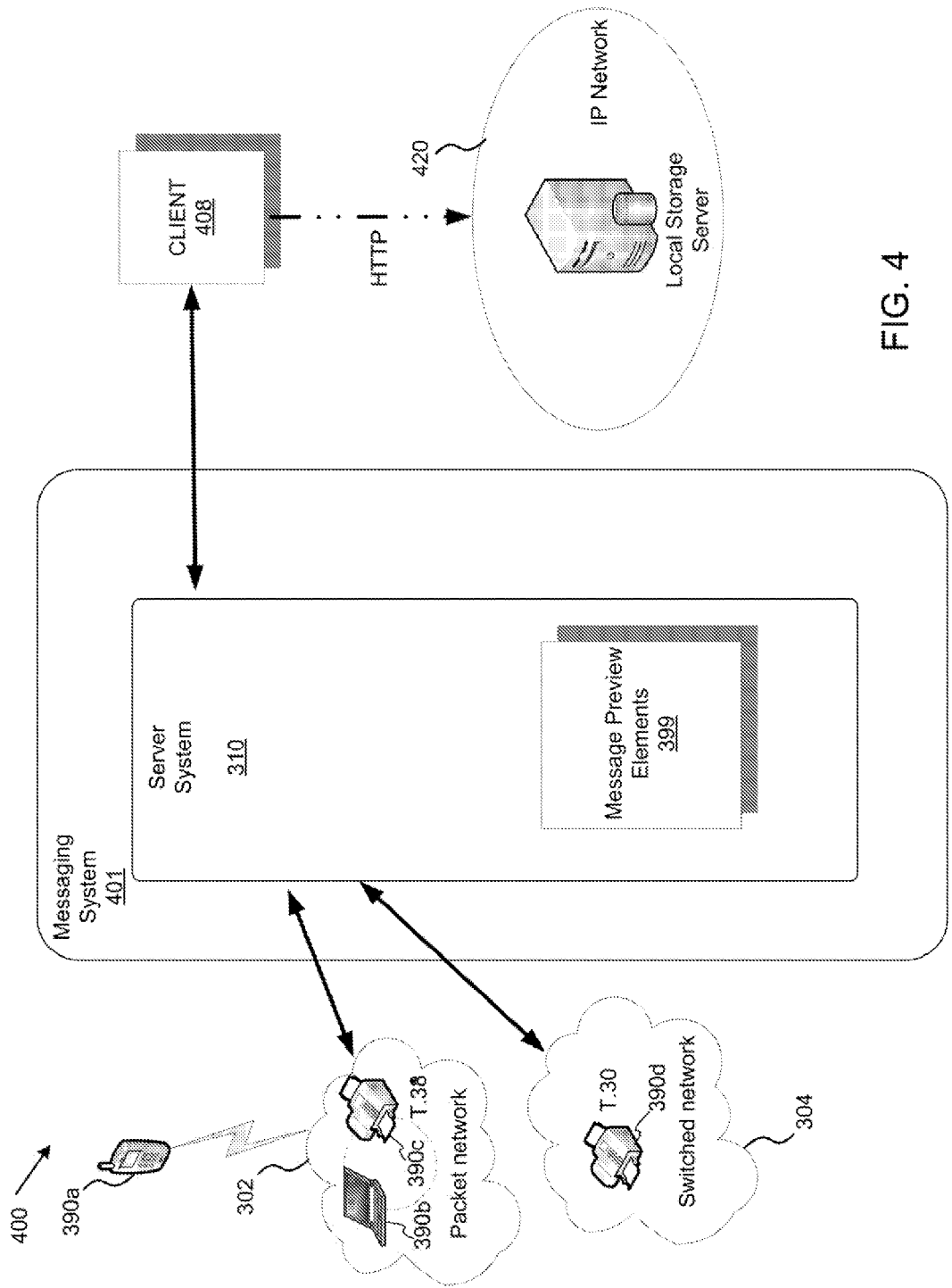
FIG. 4 depicts an example of an implementation for a messaging system in which a preview module resides external to a client system, according to at least one embodiment of the invention.

FIG. 4 depicts an example of an implementation for a messaging system in which a preview module resides external to a client system, according to at least one embodiment of the invention. Here, diagram 400 includes transmission nodes 390a to 390d of FIG. 3 operating in connection with a packet network 302 and a switched network 304, a messaging system 401 and a client system ("client") 408, and an optional locale storage server 420. Messaging system 401 can include a server system 310 and message preview elements 399, which were shown to be in client system 320 in FIG. 3. In some examples, message preview elements 399 exclude synchronization 324 when client system 408 does not locally store messages (and local storage server 420 is absent). In other examples, one or more of preview module 321, interaction module 322, access module 323, storage module 325, and synchronization module 324, none of which is shown in FIG. 4, can be distributed throughout messaging system and client system 408. In the configuration shown in FIG. 4, client system 408 can operate as a thin client as the computation resource requirements for message preview elements 399 have been ported external to client system 408.

Figure 5:
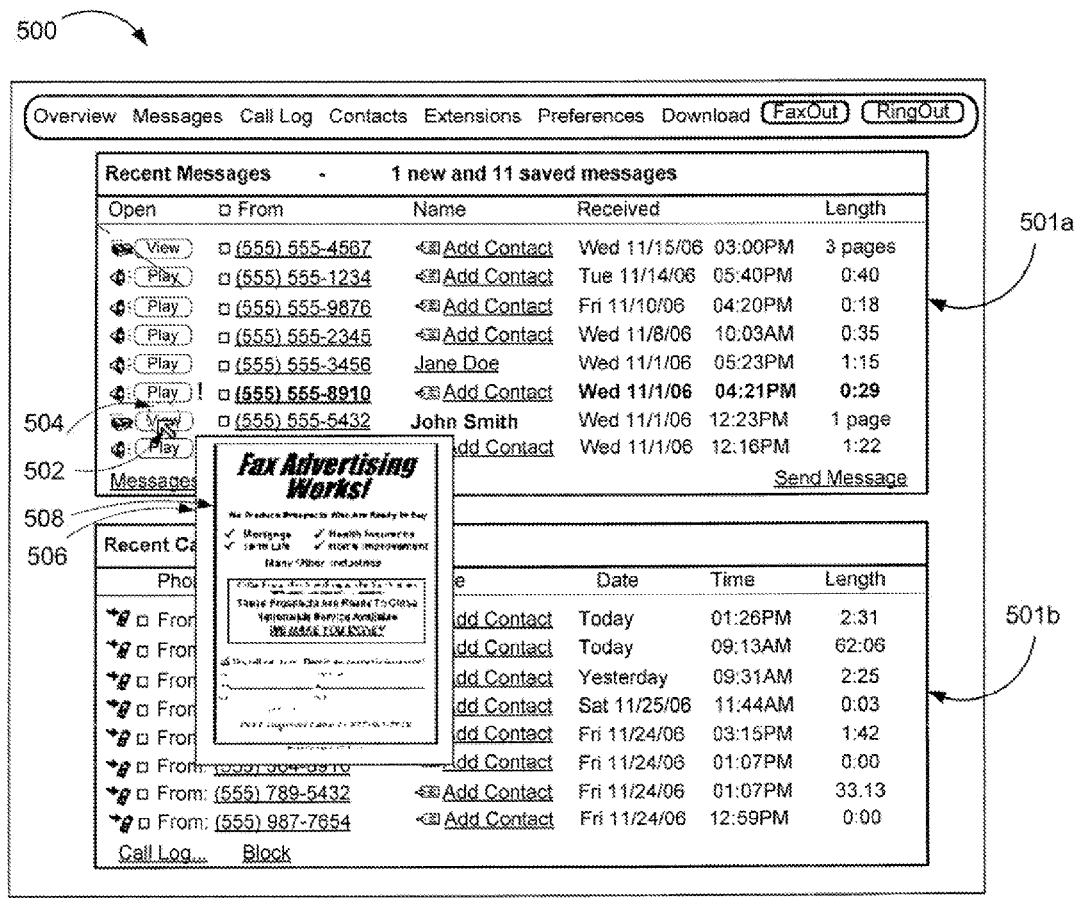
FIG. 5 illustrates an example of a communication interface including a preview window displaying a contextual portion of a message, according to at least one embodiment of the invention.

FIG. 5 illustrates an example of a communication interface including a preview window displaying a contextual portion of a message, according to at least one embodiment of the invention. Here, interface 500 includes a recent messages area 501a, and a recent calls area 501b. Further, interface 500 depicts a mouse pointer 502, a defined area 504, a preview window 506, and a preview content 508, which can include either content or contextual message information, or both, as preview information. In some examples, recent messages area 501a can be configured to display information associated with new messages received or sent by a client device (e.g., client system 320 (FIG. 3)). The information can include, but is not limited to, a phone number associated with the client device (e.g., (555) 555-5432)), a name of a user associated with a sending device (e.g., John Smith), a date and time stamp indicative of the time and date of receipt for the corresponding new message (e.g., Wed Nov. 1, 2006 at 12:23 PM), a length indicator of the message if the message contains audio data (e.g., 0:40 seconds) or number of pages of the message if the message contains text or image data (e.g., 1 page), and a message type indicator (e.g., icon representative of a facsimile machine if the message is a facsimile, or a speaker icon if the message is an audio message). In other examples, recent calls area 501b ("recent calls box") stores records associated with calls recently made by different calling parties. The recent calls box can store any number of calls, and is not limited to the quantity as shown. In general, preview module 120 (FIG. 1A) can be configured to generate preview window 506 within interface 500 upon detecting an interactive control signal. For example, the interactive control signal ("control") can be mouse pointer 502 that hovers over defined area 504. As such, the control is of the form of an icon that includes a prompt to allow the user to preview the message in an enhanced manner. For example, the enhancement made to the preview can include playing the voice message (e.g., pressing play, fast-forward, rewind, and the like), or displaying the image associated with the message in a different resolution.

In other examples, preview window 506 contains preview content 508, which is associated with the message. For example, a user opens a preview of a message sent by the sender "John Smith" using preview window 506 when mouse pointer 502 navigates or hovers over defined area 504. Further, preview window 506 can include additional attributes used for real-time filtering. The attributes can further limit the presentation of preview content 508 within preview window 506. The attributes can include one or more filters for filtering contents of a message prior to previewing the message. In some examples, content filtration can occur prior to displaying preview content 508 in preview window 506 to minimize the user's exposure to irrelevant or undesired materials. In other examples, content filtration can occur during the display of preview content 508 in preview window 506. As such, the attributes for real-time filtration can be selected by activating another control over preview window 506. For example, filtering the message in real-time can include determining another relevant portion of the message (e.g., an initial predetermined portion of an audio message). In still other examples, message filtration can include compressing the message contents for display such as displaying multiple pages of a facsimile at a lower resolution using a single page, or otherwise providing a lower resolution version of the message as part of the preview.

In some embodiments, preview window 506 can be placed proximate to either defined area 504 or mouse pointer 502. In a specific embodiment, preview window 506 can be visible at interface 500 until the interaction (e.g., mouse-over) is terminated or expired according to a time limit set by the user. In addition to the dynamic control of the location of preview window 506, the user also can adjust other aspects of preview window 506 including its size and duration of its visibility. This allows preview window 506 to remain active while allowing free movement of mouse pointer 502 to perform other functionalities. While preview content 508 is displayed in preview window 506, preview content 508 can be displayed in any manner. For example, preview content 508 can be displayed in another interface separate from communication interface 500.

In still other examples, defined area 504 can be a program-designated (e.g., using JavaScript) area on interface 500. The defined area (e.g., defined area 504) can be in any shape or size, located anywhere on the page (i.e., interface display) and can be configured by the user if desired. Further, defined area 504 can be visible or invisible to the user. The defined area operates as a control to prompt the preview of an associated message. Also, mouse pointer 502 can be controlled using hardware peripherals such as a standard mouse, a trackball, a keyboard pointer, a touch screen or any interactive device. While mouse pointer 502 is displayed in the form of an iconic arrow, using various commercially available software and hardware can provide mouse pointer 502 to visually appear as nearly any object the user desires. The user can navigate around interface 500 by either using mouse pointer 502 or a combination of navigating keystrokes. During operation, upon a pre-defined placement or interaction by the user (e.g., initiating a mouse-over control), instructions can be executed at the client (e.g., client 408 (FIG. 4)) to retrieve a preview of the message. The instructions can cause the client to request information from a server to automatically retrieve information associated with a message desired to be previewed. The retrieved data can be displayed in preview window 506 as preview content 508. For example, messaging system 200 (FIG. 2) builds preview content by allocating and partitioning the associated message stored on a server (e.g., storage server 313 (FIG. 3)), and thereafter, extracts the relevant preview content using filters. The extracted preview content (and/or contextual message information) is then forwarded to a client (e.g., client 408 (FIG. 4)). The client can be configured to field preview content requests, receive preview content from the server, process the preview content into preview module 321 (FIG. 3), and display the preview content in preview window 506 at interface 500. The server, on the other hand, can be configured to receive client requests for preview content, generate preview content about relevant message content during filtration, and forward the generated preview content to the client.

In a specific embodiment, preview content 508, can be a portion of a message containing a text or image document (e.g., a first page of a fax), or a section of a message containing voice data (e.g., the first ten seconds of a voice message). Upon the detection of an interactive control (e.g., mouse pointer over a defined area), preview content 508 associated with defined area 504 or the message is displayed in real-time or substantially real-time at interface 500. In some examples, messaging system 200 (FIG. 2) includes an audio-to-text converter to translate the section of a voice message into text, and displays the text in preview window 506. In other examples, messaging system 200 (FIG. 2) can include a text-to-audio converter to translate the portion of an electronic document into voice, and project the voice stream through preview window 506. In some examples, the term "voice stream" refers generally, to a continuous flow of data packets representing a voice message over an IP network. If desired, preview content 508 can be stored in a cache to reduce the time required to access such preview information. As such, the user examines preview content 508 displayed in preview window 506 to evaluate its message content, and determines whether or not the message should be accessed in its entirety. In some examples, system 500 and the above-described elements (i.e., the elements shown and/or indicated by reference numerals above) can be implemented differently in design, operation, configuration, and are not limited to the descriptions provided herein.

Figure 6:
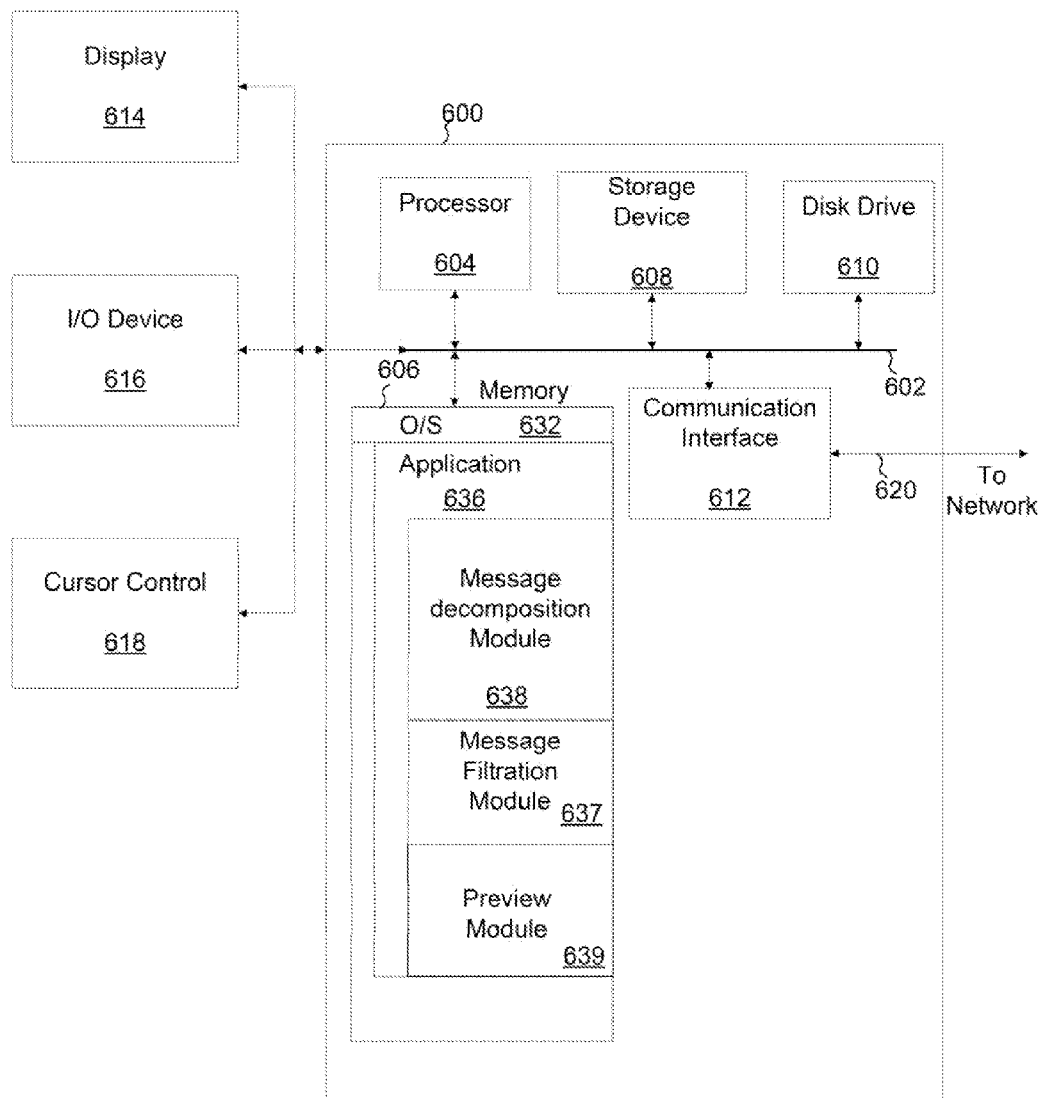
FIG. 6 illustrates an exemplary computer system suitable for generating electronic messages with preview control, according to at least one embodiment of the invention.

FIG. 6 illustrates an exemplary computer system suitable for previewing electronic messages, according to at least one embodiment of the invention. In some examples, computer system 600 can be used to implement computer programs, applications, methods, processes, or other software to perform the above-described techniques and to realize the structures described herein. Computer system 600 includes a bus 602 or other communication mechanism for communicating information, which interconnects subsystems and devices, such as a processor 604, a system memory ("memory") 606, a storage device 608 (e.g., ROM), a disk drive 610 (e.g., magnetic or optical), a communication interface 612 (e.g., modem or Ethernet card), a display 614 (e.g., CRT or LCD), an input device 616 (e.g., keyboard), and a pointer cursor control 618 (e.g., mouse or trackball). In one embodiment, pointer cursor control 618 invokes one or more commands that, at least in part, modify the rules stored, for example in memory 606, to define the electronic message preview process.

According to some examples, computer system 600 performs specific operations in which processor 604 executes one or more sequences of one or more instructions stored in system memory 606. Such instructions can be read into system memory 606 from another computer readable medium, such as static storage device 608 or disk drive 610. In some examples, hard-wired circuitry can be used in place of or in combination with software instructions for implementation. In the example shown, system memory 606 includes modules of executable instructions for implementing an operation system ("O/S") 632, an application 636 (e.g., a host, server, web services-based, distributed (i.e., enterprise) application programming interface ("API"), program, procedure or others). Further, application 636 includes a module of executable instructions for implementing a message decomposition module 638, as well as modules of executable instructions for implementing a message filtration module 637 and a preview module 639. Message decomposition module 638 includes instructions for decomposing messages into components. In some cases, message decomposition module 638 can include instructions for associating identifiers representative of attributes to components. Message filtration module 637 can be configured to generate filtered components and/or real-time filtered components. Preview module 639 includes instructions for managing the presentation of preview information, modified preview information, and, optionally, the performance of an action based on the preview information.

The term "computer readable medium" refers, at least in one embodiment, to any medium that participates in providing instructions to processor 604 for execution. Such a medium can take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 600. According to some examples, two or more computer systems 600 coupled by communication link 620 (e.g., LAN, PSTN, or wireless network) can perform the sequence of instructions in coordination with one another. Computer system 600 can transmit and receive messages, data, and instructions, including program code (i.e., application code) through communication link 620 and communication interface 612. Received program code can be executed by processor 604 as it is received, and/or stored in disk drive 610, or other non-volatile storage for later execution. In one embodiment, system 600 is implemented as a hand-held device. But in other embodiments, system 600 can be implemented as a personal computer (i.e., a desktop computer) or any other computing device. In at least one embodiment, any of the above-described delivery systems can be implemented as a single system 600 or can implemented in a distributed architecture including multiple systems 600.

In view of the foregoing, examples of a real-time message preview control are described. Electronic messaging systems can be implemented using real-time interfaces that are configured to control and manage communication dynamically over an IP network. Further electronic messaging systems can be implemented using preset filter controls to manage message content (and/or contextual message information) prior to previewing. The described techniques can be used to emulate other electronic messaging technologies by receiving messages with generated message preview independent of content storing.

In other examples, electronic messaging systems can be implemented from a sending fax node to a receiving fax node. The fax nodes (e.g., sending fax node, receiving fax node) can be of the form of a personal computer, a computing device, a mobile device, a mobile telephone, a facsimile device, a personal digital assistant ("PDA") or other electronic device. Messages can be of the form of email messages, facsimiles, text messages, short messaging service ("SMS"), web pages, audible messages, multimedia messaging service ("MMS"), or other message types. Various embodiments can apply to any electronic message and are not limited to electronic messages.

In at least some of the embodiments of the invention, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment may provide one or more of the advantages discussed above. In the claims, elements and/or operations do not imply any particular order of operation, unless explicitly stated in the claims. It is intended that the following claims and their equivalents define the scope of the invention.

The invention claimed is:

1. A method of previewing messages comprising:
generating at a mobile phone representations for messages to present on a touch screen interface, the representations for the messages including a representation for a voice message;
initiating the generation of a preview window in the touch screen interface in response to detecting selection of the representation for the voice message;
facilitating the presentation of a first control input to preview information for the voice message in association with the preview window, the preview information including message content;
causing the display of at least a portion of the message content based on at least a portion of the voice message;
receiving an interactive control signal indicative of an interaction with a portion of the touch screen interface including the first control input, the interactive control signal configured to cause the playing of audio for at least the portion of the voice message; and
facilitating the presentation of the playing of the audio.

2. The method of claim 1 further comprising:
facilitating the presentation of the playing of the audio contemporaneous to causing the display of at least the portion of the message content.

3. The method of claim 1 wherein causing the display of at least the portion of the message content comprises:
causing the display of a replica of at least a portion of the voice message.

4. The method of claim 1 further comprising:
accepting a second control input to modify the preview information to form modified preview information; and
facilitating the presentation of the modified preview information including at least a portion of a modified voice message.

5. The method of claim 4 wherein facilitating the presentation of the modified preview information comprises:
causing modification in the playing of the audio.

6. The method of claim 5 wherein causing modification in the playing of the audio comprises:
fast-forwarding the playing of the audio.

7. The method of claim 5 wherein causing modification in the playing of the audio comprises:
rewinding the playing of the audio.

8. The method of claim 5 wherein causing modification in the playing of the audio comprises:
changing the resolution of the audio.

9. The method of claim 1 wherein causing the display of at least the portion of the message content further comprises:
causing the display of text representing at least the portion of the message content.

10. The method of claim 9 wherein causing the display of text comprises:
converting speech signals of the audio into the text.

11. The method of claim 10 wherein converting the speech signals of the audio into the text occurs at a messaging system including a processor and memory storing executable instructions to perform speech-to-text operations, the mobile phone being configured to receive data representing the text from the messaging system.

12. The method of claim 1 wherein further comprising:
facilitating the presentation of the preview information to include contextual message information; and
displaying at least a portion of the contextual message information.

13. The method of claim 12 wherein displaying at least the portion of the contextual message information comprises:
displaying a phone number of a caller.

14. The method of claim 12 wherein displaying at least the portion of the contextual message information comprises:
displaying a date and time stamp.

15. The method of claim 12 wherein displaying at least the portion of the contextual message information comprises:
displaying a length indictor representing a length of time of the audio for at least the portion of the voice message.

16. The method of claim 1 further comprising:
defining an area on the touch screen interface to form a defined area associated with the representation for the voice message; and
receiving a signal based on an interaction with the defined area for selecting the representation for the voice message,
wherein receiving the signal based on the interaction includes identifying that the interaction is a user interaction via the touch screen interface.

17. A mobile device configured to communicate via a network with a messaging system, the mobile device comprising:
a touch screen configured to provide an interface;
a memory including executable instructions; and
a processor configured to execute the executable instructions to:
generate representations for messages to present on the interface, the representations for the messages including a representation for a voice message received from the messaging system;
detect selection of the representation for the voice message;
generate a window in response to the selection of the representation for the voice message;
receive data representing preview information including message content and contextual message information;
present the message content in the window as text representing at least a portion of the voice message;
receive an interactive control signal indicative of an interaction with a portion of the interface, the interactive control signal configured to cause the playing of audio for at least the portion of the voice message; and
play the audio.

18. The mobile device of claim 17 wherein the processor is further configured to execute instructions to:
facilitate the presentation of the contextual message information; and
display at least a portion of the contextual message information in the window as one of:
a phone number of a caller,
a date and time stamp, and
a length of time of the audio.

19. The mobile device of claim 17 wherein the processor is further configured to execute instructions to:
accept a control input to modify presentation of the message content to form modified message content; and
cause modification in the playing of the audio by executing other instructions configured to:
fast-forward the playing of the audio, and
rewind the playing of the audio.

20. A method of previewing messages comprising:
initiating at a computing device generation of representations for messages to present on an interface, the representations for the messages including a representation for a voice message;
defining an area on the interlace to form a defined area associated with the representation for the voice message;
determining an interaction with the defined area to select the representation for the voice message;
initiating generation of a window in at least a portion of the interface in response to determining the interaction;
facilitating presentation of preview information for the voice message in the window, the preview information including message content and contextual message information;
initiating display of the message content in the window as text representing at least a portion of the voice message;
initiating display of the contextual message information in the window as one of: a phone number of a caller, a date and time stamp, and a length of time of the audio;
receiving an interactive control signal indicative of an interaction with at least the portion of the interface, the interactive control signal configured to modify the playing of audio associated with the message content; and
facilitating presentation of modified playing of audio of at least the portion of the voice message.

* * * * *

UNITED STATES PATENT AND TRADEMARK OFFICE
CERTIFICATE OF CORRECTION

| | |
|---|---|
| PATENT NO. | : 8,384,942 B1 |
| APPLICATION NO. | : 13/403963 |
| DATED | : February 26, 2013 |
| INVENTOR(S) | : Schmunis et al. |

Page 1 of 1

It is certified that error appears in the above-identified patent and that said Letters Patent is hereby corrected as shown below:

In the Claims:

Column 18, line 21, claim 20, delete "interlace" and replace with --interface--, therefor.

Signed and Sealed this
Twenty-fifth Day of June, 2013

Teresa Stanek Rea
*Acting Director of the United States Patent and Trademark Office*